United States Patent [19]

DeSimone et al.

[11] Patent Number: 5,530,077
[45] Date of Patent: Jun. 25, 1996

[54] MULTI-PHASE POLYMERIZATION PROCESS

[75] Inventors: Joseph M. DeSimone, Chapel Hill; Timothy Romack, Durham, both of N.C.

[73] Assignee: The University of North Carolina at Chapel Hill, Chapel Hill, N.C.

[21] Appl. No.: 450,373

[22] Filed: May 25, 1995

Related U.S. Application Data

[62] Division of Ser. No. 409,880, Mar. 24, 1995.

[51] Int. Cl.[6] .................................................. C08F 2/16
[52] U.S. Cl. ........................... 526/89; 526/942; 526/255; 526/344; 526/329.7; 526/346; 526/331; 526/295
[58] Field of Search ...................................... 526/89, 942

[56] References Cited

U.S. PATENT DOCUMENTS

| | | |
|---|---|---|
| 3,471,463 | 10/1969 | Kagiya et al. |
| 3,522,228 | 7/1970 | Fukui et al. |
| 4,499,249 | 2/1985 | Nakagawa et al. |
| 4,748,220 | 5/1988 | Hartmann et al. |
| 4,861,845 | 8/1989 | Slocum et al. |
| 4,933,404 | 6/1990 | Beckman et al. |
| 5,182,342 | 1/1993 | Feiring et al. |
| 5,312,882 | 5/1994 | DeSimone et al. |
| 5,328,972 | 7/1994 | Dada et al. |
| 5,345,013 | 9/1994 | Van Bramer et al. |
| 5,382,623 | 1/1995 | DeSimone et al. |

FOREIGN PATENT DOCUMENTS

| | | |
|---|---|---|
| 0301532 | 2/1989 | European Pat. Off. |
| WO93/20116 | 10/1993 | WIPO. |

OTHER PUBLICATIONS

T. Suwa et al; Melting and Crystallization Behavior of Poly (tetrafluoroethylene). New Method for Molecular Weight Measurement of Poly (tetrafluoroethylene) Using a Differential Scanning Calorimeter; *Journal of Applied Polymer Science* 17, pp. 3253–3257 (1973).

J. M. DeSimone et al; Synthesis of Fluoropolymers in Supercritical Carbon Dioxide; *Science* pp. 1–3 (1992).

A. E. Feiring; Fluoroplastics; *Organofluorine Chemistry: Principles and Commercial Applications* pp. 339–372 (1994).

A. L. Logothetis; Fluoroelastomers; *Organofluorine Chemistry: Principles and Commercial Applications* pp. 373–396 (1994).

A. E. Feiring; Introduction to Fluorinated Polymers; *American Chemical Society* Part 1; pp. 1–59 (1992).

A. T. Worm; Introduction to Fluorocarbon Elastomers; *American Chemical Society* Part 2; pp. 1–40. (1992).

S. V. Gangal; Tetrafluoroethylene–Ethylene Copolymers; *Encyclopedia of Polymer Science and Engineering* 16, pp. 626–642 (1985).

M. B. King et al; The Mutual Solubilities of Water with Supercritical and Liquid Carbon Dioxide; *The Journal of Supercritical Fluids* 5, pp. 296–302 (1992).

Primary Examiner—Joseph L. Schofer
Assistant Examiner—N. Sarofin
Attorney, Agent, or Firm—Bell, Seltzer, Park & Gibson

[57] ABSTRACT

The present invention provides a multi-phase polymerization process for making a water insoluble polymer. The process includes (1) providing a mixture comprising carbon dioxide and an aqueous phase, and containing a monomer and a polymerization initiator, and (2) polymerizing the monomer in the reaction mixture. The monomer may be a hydrocarbon or a fluorinated monomer. The polymerization initiator may be soluble in the aqueous phase, soluble in carbon dioxide, or insoluble in both the aqueous phase and carbon dioxide, such that the initiator forms a separate phase.

The present invention also provides multi-phase polymerization reaction mixtures useful in the process of making water insoluble polymers.

19 Claims, No Drawings

MULTI-PHASE POLYMERIZATION PROCESS

This application is a divisional of pending prior application Ser. No. 08/409,880, filed Mar. 24, 1995, the disclosure of which is incorporated herein in its entirety.

FIELD OF THE INVENTION

The present invention relates to a multi-phase polymerization process for making polymers in the presence of carbon dioxide.

BACKGROUND OF THE INVENTION

Polymerization processes can generally be classified into two basic types: homogeneous and heterogeneous processes. This classification is usually based on whether the initial reaction mixture or the final reaction mixture or both is homogeneous or heterogenous. Some polymerization systems which start out as homogeneous may become heterogeneous as the polymerization reaction proceeds, due to the insolubility of the resulting polymer in the polymerization media.

Heterogeneous polymerizations are used extensively as a means to control the thermal and viscosity problems associated with mass and solution polymerizations. Emulsion polymerization is a heterogeneous polymerization process used by industry to polymerize a variety of monomers. The use of a water or water-rich phase in emulsion polymerizations is common. Polymers commonly formed by emulsion polymerization include acrylics, styrenics, polyvinylchloride, styrene-butadiene rubber, ethylene-propylene-diene terpolymer, polystyrene, acrylonitrile-butadiene-styrene copolymers, neoprene rubber, ethylene-vinylacetate, copolymers, styrene-maleic anhydride polymers, poly(tetrafluoroethylene), tetrafluoroethylene copolymers, poly(vinylfluoride), and the like.

Heterogenous polymerizations employing a carbon dioxide phase have recently been proposed. Carbon dioxide is a desirable media for polymerization because it is inexpensive and environmentally safe. U.S. Pat. No. 5,312,882 to DeSimone et al. proposes a heterogenous polymerization process for the synthesis of water-insoluble polymers in carbon dioxide. The heterogenous reaction mixture includes carbon dioxide, monomer, and surfactant. The disclosed heterogenous reaction does not include a water or water-rich phase. U.S. Pat. No. 4,933,404 to Beckman et al. proposes a microemulsion polymerization system including a low polarity fluid which is a gas at standard temperature and a second, water phase. The monomer is soluble in the water phase, and is polymerized in the micelles to produce a water soluble polymer.

Carbon dioxide has also been employed in polymerization systems for the polymerization of hydrocarbon and fluorinated monomers. For example, U.S. Pat. No. 3,522,228 to Fukui et al. proposes the polymerization of vinyl monomers using hydrocarbon polymerization initiators in carbon dioxide. U.S. Pat. No. 4,861,845 to Slocum et al. discloses a gas phase polymerization of tetrafluoroethylene and other fluoromonomers diluted with gaseous carbon dioxide. PCT Publication No. WO 93/20116 to the University of North Carolina at Chapel Hill discloses processes for making fluoropolymers which include solubilizing a fluoromonomer in a solvent comprising carbon dioxide. The fluoromonomers are selected from the group consisting of fluoroacrylate monomers, fluoroolefin monomers, fluorostyrene monomers, fluorinated vinyl ether monomers, and fluoroalkylene oxide monomers.

There remains a need in the art for a method of making polymers which avoids the use of expensive or environmentally objectionable solvents and which are relatively easily separable from the polymer produced. In addition, it would be desirable to provide polymerization processes, particularly for the polymerization of fluorinated monomers, which is capable of commercialization in conventional polymerization equipment.

SUMMARY OF THE INVENTION

As a first aspect, the present invention provides a multi-phase polymerization process for making water insoluble polymers. The process includes (1) providing a reaction mixture comprising carbon dioxide and an aqueous phase, and containing a monomer and a polymerization initiator, and (2) polymerizing the monomer. The monomer is generally solubilizable in carbon dioxide. The polymerization process is useful for the polymerization of hydrocarbon monomers and fluorinated monomers. The polymerization initiator may be soluble in the aqueous phase, soluble in carbon dioxide, or insoluble in both the aqueous phase and carbon dioxide, such that the initiator forms a separate phase, with or without a surfactant.

As a second aspect, the present invention provides a multi-phase mixture including carbon dioxide and an aqueous phase, and containing a monomer and a polymerization initiator, with or without a surfactant.

As a third aspect, the present invention provides a multi-phase polymerization process for making water insoluble polymers including the steps of providing a reaction mixture including carbon dioxide and an aqueous phase, and a water insoluble polymer; and separating the polymer from the reaction mixture, with or without a surfactant.

As a fourth aspect, the present invention provides a multi-phase mixture produced from the multi-phase polymerization of a monomer. The reaction mixture includes carbon dioxide and an aqueous phase, and a water insoluble polymer, with or without a surfactant.

The foregoing and other aspects of the present invention are explained in detail in the detailed description set forth below.

DETAILED DESCRIPTION OF THE INVENTION

As used herein, the term "supercritical" has its conventional meaning in the art. A supercritical fluid (SCF) is a substance above its critical temperature and critical pressure (or "critical point"). Compressing a gas normally causes a phase separation and the appearance of a separate liquid phase. However, if the fluid is in a supercritical state, compression will only result in density increases: no liquid phase will be formed. The use of supercritical fluids for carrying out polymerization processes has received relatively little attention. The term "fluoropolymer," as used herein, has its conventional meaning in the art. See generally *Fluoropolymers* (L. Wall, Ed. 1972)(Wiley-Interscience Division of John Wiley & Sons); See also *Fluorine-Containing Polymers*, 7 Encyclopedia of Polymer Science and Engineering 256 (H. Mark et al. Eds., 2d Ed. 1985). Likewise, the term "fluoromonomer" or "fluorinated monomer" refers to fluorinated precursor monomers employed in the synthesis of fluoropolymers.

The processes of the present invention are carried out in a mixture comprising a carbon dioxide phase and an aqueous phase. The carbon dioxide phase may be in a gaseous, liquid or supercritical state. As will be appreciated by those skilled in the art, all gases have a critical temperature above which the gas cannot be liquified by increasing pressure, and a critical pressure, or pressure which is necessary to liquify the gas at the critical temperature. For example, carbon dioxide in its supercritical state exists as a form of matter in which its liquid and gaseous states are indistinguishable from one another. For carbon dioxide, the critical temperature is about 31° C. and its critical pressure is greater than about 1070 psi. Liquid carbon dioxide may be obtained at temperatures of from about 31° C. to about –55° C.

The aqueous phase of the mixture typically comprises water, but may include other additives such as acids, bases, salts, pH buffers, alcohols, and the like. Suitable additives are known to those skilled in the art.

The ratio of carbon dioxide phase to aqueous phase in the reaction mixture will depend upon the monomer or comonomers to be polymerized, and the reaction conditions. Generally, the ratio of carbon dioxide phase to aqueous phase in the reaction mixture will be between about 1:99 and about 99:1 parts by volume.

The mixture may also include one or more co-solvents. Suitable co-solvents will not cause excessive chain transfer. Illustrative of co-solvents which may be employed in the processes of the present invention include but are not limited to $C_2$–$C_8$ hydrocarbons, $C_1$–$C_8$ alcohols, methylene chloride, toluene, cyclohexane, methylethylketone, acetone, ethylacetate, tetrahydrofuran, perfluorocarbons, hydrofluorocarbons, perfluoroalkyl sulfides, and the like.

The monomers useful in the processes of the present invention include any suitable monomer known to those skilled in the art which is capable of producing a water insoluble polymer. The processes of the present invention are particularly suitable for the polymerization of hydrocarbon and fluorinated monomers. The monomers may be in a gaseous or liquid state. Generally, the monomers useful in the processes of the present invention are capable of free radical polymerization.

The hydrocarbon monomers which are useful in the processes of the present invention include any suitable hydrocarbon monomer known to those skilled in the art which are capable of producing water insoluble polymers. Specific examples of suitable hydrocarbon monomers include, but are not limited to, vinyl monomers such as vinyl chloride and vinyl acetate; ethylene; propylene; acrylonitrile; dienes such as isoprene, chloroprene, and butadiene; styrenics such as styrene and t-butyl styrene; acrylic monomers such as alkyl(meth)acrylates, alkylacrylates, methacrylic acid, and acrylic acid; acrylamides; maleic anhydride; and vinyl ether monomers.

Preferred fluorinated monomers which are useful in the processes of the present invention will contain at least one fluorine atom, perfluoroalkyl group, or perfluoroalkoxy group directly attached to the vinyl group that undergoes polymerization. Examples of suitable fluorinated monomers include, but are not limited to, perfluoroolefins, particularly tetrafluoroethylene, perfluoro(alkyl vinyl ethers) with perfluoroalkyl groups containing 1 to 6 carbon atoms and those containing functional groups such as $CF_2=CFOCF_2CF(CF_3)OCF_2CF_2SO_2F$ and $CF_2=CFOCF_2CF(CF_3)OCF_2CF_2CO_2CH_3$, hexafluoropropylene, perfluoro(2,2-dimethyldioxole), cure site monomers such as bromotrifluoroethylene and partially fluorinated monomers, particularly vinyl fluoride, vinylidene fluoride, chlorotrifluoroethylene, and perfluoroalkyl ethylenes with perfluoroalkyl groups containing 1 to 6 carbon atoms. Preferred fluoromonomers include tetrafluoroethylene, hexafluoropropylene, perfluoromethylvinyl ether, perfluoroethylvinyl ether, perfluoropropylvinyl ether, vinyl fluoride, vinylidene fluoride, chlorotrifluoroethylene, and perfluoro(2,2-dimethyldioxole).

The polymers produced according to the processes of the present invention include homopolymers of any of the foregoing monomers, or in the embodiment wherein two or more comonomers are employed, the polymers may be copolymers. Exemplary homopolymers which may be produced according to the methods of the present invention include but are not limited to polyethylene, polyvinylchloride, polymethyl methacrylate, polystyrene, polychlorotrifluoroethylene, polytetrafluoroethylene, polyvinylfluoride, polyvinylidenefluoride, and the like.

The polymerization process of the present invention may be carried out with comonomers. The comonomers may be any of the hydrocarbon or fluorinated monomers described above, which are capable of copolymerizing. Any combination of copolymerizable monomers may be employed to produce a water insoluble polymer, including copolymerizable hydrocarbon monomers and fluorinated monomers.

Copolymers which may be produced according to the processes of the present invention include but are not limited to
tetrafuoroethylene/hexafluoropropylene,
tetrafluoroethylene/hexafluoropropylene/vinylidene fluoride,
hexafluoropropylene/vinylidene fluoride,
perfluoro(methyl vinyl ether)/vinylidene fluoride,
perfluoro(methyl vinyl ether)/vinylidene fluoride/tetrafluoroethylene,
chlorotrifluoroethylene/vinylidene fluoride,
chlorotrifluoroethylene/ethylene,
chlorotrifluoroethylene/tetrafluoroethylene/ethylene,
tetrafluoroethylene/perfluoro(propyl vinyl ether),
tetrafluoroethylene/perfluoro(methyl vinyl ether),
tetrafluoroethylene/perfluoro(2,2-dimethyl-1,3-dioxole),
tetrafluoroethylene/ethylene,
tetrafluoroethylene/propylene,
tetrafluoroethylene/$CF_2=CFOCF_2CF(CF_3)OCF_2CF_2SO_2F$,
tetrafluoroethylene/$CF_2=CFOCF_2CF_2SO_2F$,
tetrafluoroethylene/hexafluoropropylene/perfluoro(propyl vinyl ether),
styrene/butadiene,
styrene/chloroprene,
styrene/acylonitrile,
acrylonitrile/butadiene,
ethylene/vinyl acetate,
chloroprene/methyl mechacrylate, and
chloroprene/acrylonitrile.

The initiator employed in the processes of the present invention may be soluble in the aqueous phase or insoluble in the aqueous phase. Initiators which are insoluble in the aqueous phase may be soluble in carbon dioxide or insoluble in both the aqueous phase and carbon dioxide such that the initiator forms a separate phase. Examples of suitable initiators which are insoluble in the aqueous phase include but are not limited to halogenated initiators and other hydrocarbon free radical initiators. Suitable halogenated initiators include, for example, chlorinated and fluorinated initiators. For example, suitable halogenerated polymerization initiators include chlorocarbon and fluorocarbon based acyl peroxides such as trichloroacetyl peroxide, bis(perfluoro-2- propoxy propionyl peroxide, [CF$_3$CF$_2$CF$_2$OCF(CF$_3$)COO]$_2$; perfluoropropionyl peroxides, (CF$_3$CF$_2$CF$_2$COO)$_2$, (CF$_3$CF$_2$COO)$_2$,{CF$_3$CF$_2$CF$_2$)[CF(CF(CF$_3$)CF$_2$O]$_n$C$_F$)CF$_3$) COO}$_2$, [ClCF$_2$(CF$_2$)$_n$COO]$_2$, and [HCF$_2$(CF$_2$)$_n$COO]$_2$ where n=0–8; perfluoroalkyl azo compounds such as perfluoroazoisopropane, [(CF$_3$)$_2$CFN=]$_2$; R$_4$N=NR$_4$, where R$_4$ is a linear or branched perfluorocarbon group having 1–8 carbons; stable or hindered perfluoroalkane radicals such as hexafluoropropylene trimer radical, [(CF$_3$)$_2$C$_F$]$_2$(CF$_2$CF$_3$)C· radical and perfluoroalkanes. Preferred halogenated initiators include trichloroacetyl peroxide, bis(perfluoro-2-propoxy propionyl peroxide, perfluoropropionyl peroxide, perfluoroazoisopropane, and hexafluoropropylene trimer radical. Examples of hydrocarbon free radical initiators include but are not limited to acetylcyclohexanesulfonyl peroxide, diacetyl peroxydicarbonate, dicyclohexyl peroxydicarbonate, di-2-ethylhexyl peroxydicarbonate, t-butyl perneodecanoate, 2,2'-azobis (methoxy-2,4-dimethylvaleronitrile), t-butyl perpivalate, dioxtanoyl peroxide, dilauroyl peroxide, 2,2'-azobis(2,4-dimethylvaleronitrile), t-butylazo-2-cyanobutane, dibenzoyl peroxide, t-butyl per-2-ethylhexanoate, t-butyl permaleate, 2,2'-azobis(isobutyronitrile), bis(t-butyl peroxy)cyclohexane, t-butyl peroxyisopropylcarbonate,t-butylperacetate, 2,2-bis(t-butylperoxy)butane,dicumyl peroxide, di-t-amyl peroxide, di-t-butyl peroxide, p-menthane hydroperoxide, pinane hydroperoxide, cumene hydroperoxide, and t-butyl hydroperoxide. Preferred hydrocarbon free radical initiators include azobisisobutyronitrile ("AIBN"), dilauroyl peroxide, diisopropyl peroxy dicarbamate, t-butyl hydroperoxide, di-t-butyl peroxide, and dicumyl peroxide.

Initiators which are soluble in the aqueous phase include but are not limited to inorganic peroxides such as hydrogen peroxide or persulfate ion; potassium permanganate; disuccinic acid peroxide; and redox initiators such as alkali metal persulfates and bisulfates, ammonium persulfates, ferrous sulfates, silver nitrate, and cupric sulfate, or any combinations thereof.

The initiator may be added in neat form, or it may conveniently be added as a solution in a co-solvent. Typically, the initiator is used in an amount conventionally employed for polymerization. For example, the initiator may be used in an amount of about $10^{-6}$ to 10, preferably about $10^{-5}$ to 2, parts by weight per 100 parts by weight monomer.

The processes of the present invention may also include a surfactant. Any suitable surfactant known to those skilled in the art may be employed. Typical surfactants include anionic surfactants, cationic surfactants, zwitterionic surfactants, non-ionic block and graft copolymer surfactants and polymeric surfactants and stabilizers. For example, suitable polymeric stabilizers include, but are not limited to poly(vinyl alcohol), hydroxy propyl cellulose, sodium(styrene sulfonate), poly(ethylene oxide), and the sodium salt of poly(acrylic acid). Examples of useful anionic surfactants include but are not limited to fatty acid soaps such as sodium or potassium stearate, laurate, and palmitate, sulfonate, sulfates, and fluorinated surfactants such as perfluoro-octanoic acid and salts thereof including sodium and ammonium salts thereof. Examples of useful non-ionic surfactants includes surfactants from the pluronic family, SPAN™ family, or TWEEN™ family and poly(propyleneoxide)-g-poly-(ethylene oxide). Examples of useful cationic surfactants include but are not limited to dodecylammonium chloride and acetyltrimethyl ammonium bromide.

In addition, silicon and fluorocarbon surfactants are useful. Examples include but are not limited to poly(1,1-dihydroperfluorooctyl acrylate) and random, block, and graft copolymers thereof, poly(1,1,2,2-tetrahydroperfluoroacrylates and methacrylates) and random, block, and graft copolymers thereof, polysiloxanes and block and graft copolymers thereof, particularly those with hydrophillic ethylene oxide segments.

The processes of the present invention may optionally include other agents capable of modifying, regulating or controlling the physical or chemical properties of the resulting polymer. For example, one skilled in the art will appreciate that a chain transfer agent may be employed to regulate the molecular weight of the resulting polymer, thus controlling the physical and chemical properties thereof. Chain transfer agents which may optionally be employed in the processes of the present invention include but are not limited to alcohols such as methanol, mercaptans such as ethyl and butyl mercaptan, sulfides such as butyl sulfide, halogen containing species such as alkyl halides such as alkyl iodide, perfluoroalkyl iodides, alkyl bromides, perfluoroalkyl bromides, carbon tetrachloride, and chloroform, and alkanes such as ethane and methyl cyclohexane.

It may be desirable to include compounds which accelerate the decomposition of the initiator. Such compounds typically permit the polymerization reaction to take place at lower pressures than would otherwise be required, thus permitting the methods of the present invention to be practiced in conventional fluoropolymerization reactors. Suitable compounds which accelerate decomposition are known to those skilled in the art and include but are not limited to, redox systems, sulfur dioxide, ultraviolet light and the like.

The polymerization reaction may be carried out at a temperature of about –50° C. up to about 200° C., and is typically carried out at a temperature of between about –20° C. and about 150° C. Suitable antifreeze agents, such as ethylene glycol may be added to the aqueous phase of the reaction mixture to avoid freezing the aqueous phase during reactions which are conducted at temperatures below the freezing point of the aqueous phase. The reaction may be carried out at a pressure ranging from about 15 psi to about 45,000 psi, and is typically carried out at a pressure of between about 500 psi and about 10,000 psi.

The polymerization can be carried out batchwise or continuously with thorough mixing of the reactants in any appropriately designed high pressure reaction vessel, or tubular reaction vessel. To remove the heat evolved during the polymerization, advantageously the pressure apparatus includes a cooling system. Additional features of the pressure apparatus used in accordance with the invention include heating means such as an electric heating furnace to heat the reaction mixture to the desired temperature and mixing means, i.e., stirrers such as paddle stirrers, impeller stirrers, or multistage impulse countercurrent agitators, blades, and the like.

The polymerization can be carried out, for example, by placing the monomer and initiator in the pressure apparatus and introducing carbon dioxide and the aqueous phase. The reaction vessel is closed and the reaction mixture brought to the polymerization temperature and pressure. Alternatively, only a part of the reaction mixture may be introduced into an autoclave and heated to the polymerization temperature and pressure, with additional reaction mixture being pumped in at a rate corresponding to the rate of polymerization. In another possible procedure, some of the monomers are initially taken into the autoclave in the total amount of carbon dioxide and the monomers or comonomers are pumped into the autoclave together with the initiator at the rate at which the polymerization proceeds.

When the polymerization is complete the polymer may be separated from the reaction mixture. Any suitable means of separating the polymer from the carbon dioxide and aqueous phase may be employed. Typically, according to the process of the present invention, the polymer is separated from the reaction mixture by venting the carbon dioxide to the atmosphere. Thereafter the polymer may be collected simply by physical isolation.

The polymers produced according to the processes of the present invention are useful as thermoplastics and elastomers which are useful for the manufacture of adhesives and molded articles such as valves, bottles, films, fibers, resins, and matrices. The fluoropolymers in particular have applications in areas where conventional fluoropolymers are employed, and particularly as wire coatings, gaskets, seals, hoses, vessel linings, elastomers, molded resins, protective coatings, and the like.

The following examples are provided to illustrate the present invention, and should not be construed as limiting thereof. In these examples, Kg means kilograms, g means grams, mg means milligrams, L means liters, mL means milliliters, J means Joules, J/g means Joules per gram, mol means mole(s), Kg/mol means kilograms per mole, rpm means revolutions per minute, TFE means tetrafluoroethylene, $CO_2$ means carbon dioxide, $K_2S_2O_8$ means potassium persulfate, DSC means Differential Scanning Calorimetry, and ° C. means degrees Centigrade. Molecular weight estimated using the method described in T. Suwa, et al., *J. Applied Polymer Sci.* 17:3253 (1973).

EXAMPLE 1

To a 25-mL stainless steel reaction vessel equipped with a horizontal paddle type stirrer is added 25 mg $K_2S_2O_8$, 10 mL water and 25 mg perfluorooctanoic acid. The cell is cooled to well below 0° C. and 10 g of a 50:50 mixture of TFE:$CO_2$ (5 g TFE, 5 g $CO_2$) is condensed in under pressure. The reactor is gradually warmed to 50° C. Stirring is started as soon as the ice in the cell melts allowing the stirrer to rotate freely. Stirring is maintained for 24 hours at 50° C. before the pressure is vented from the cell, the cell opened and the contents recovered. The reaction yields 3.6 g of product (72% yield) DSC analysis yields a virgin melting point of 329.9° C., a second melt of 330.0° C. and a heat of crystallization of –60.9 J/g (2nd heat) corresponding to an estimated number average molecular weight of 20 Kg/mol.

EXAMPLE 2

To a 25-mL stainless steel reaction vessel equipped with a horizontal paddle type stirrer is added 25 mg $K_2S_2O_8$, 10 mL water and 25 mg sodium perfluorooctanoate. The cell is cooled to well below 0° C. and 10 g of a 50:50 mixture of TFE:$CO_2$ (5 g TFE, 5 g $CO_2$) is condensed in under pressure. The reactor is gradually warmed to 50° C. Stirring is started as soon as the ice in the cell melts, allowing the stirrer to rotate freely. Stirring is maintained for 24 hours at 50° C. before the pressure is vented from the cell, the cell opened and the contents recovered. The reaction yields 4.1 g of product (82% yield). DSC analysis yields a virgin melting point of 330.0° C., a second melt of 329.9° C. and a heat of crystallization of –60.9 J/g (2nd melt) corresponding to an estimated number average molecular weight of 20 Kg/mol.

EXAMPLE 3

To a 25-mL stainless steel reaction vessel equipped with a horizontal paddle type stirrer is added 2.9 mg $K_2S_2O_8$ and 10 mL water. The cell is cooled to well below 0° C. and 8.2 g of a 50:50 mixture of TFE:$CO_2$ (4.1 g TFE, 4.1 g $CO_2$) is condensed in under pressure. The reactor is gradually warmed to 80° C. Stirring is started as soon as the ice in the cell melts, allowing the stirrer to rotate freely. Stirring is maintained for 3 hours at 80° C. before the pressure is vented from the cell, the cell opened and the contents recovered. The reaction yields 2.0 g of product (49% yield). DSC analysis yields a virgin melting point of 334.7° C., a second melt of 333.1° C. and a heat of crystallization of –50.8 J/g (2nd melt) corresponding to an estimated number average molecular weight of 60 Kg/mol.

EXAMPLE 4

To a 25-mL stainless steel reaction vessel equipped with a horizontal paddle type stirrer are added 0.29 mg $K_2S_2O_8$ and 10 mL water. The cell is cooled to well below 0° C. and 10.5 g of a 50:50 mixture of TFE:$CO_2$ (5.2 g TFE, 5.2 g $CO_2$) is condensed in under pressure. The reactor is gradually warmed to 75° C. Stirring is started as soon as the ice in the cell melts allowing the stirrer to rotate freely. Stirring is maintained for 7 hours at 75° C. before the pressure is vented from the cell, the cell opened and the contents recovered. The reaction yields 0.37 g (7.0% yield). DSC analysis yields a virgin melting point of 337.7° C., a second melt of 331.2° C. and a heat of crystallization of –40.6 J/g (2nd melt) corresponding to an estimated number average molecular weight of 170 Kg/mol.

EXAMPLE 5

To a 25-mL stainless steel reaction vessel equipped with a horizontal paddle type stirrer is added 0.49 mg $K_2S_2O_8$ and 10 mL water. The cell is cooled to well below 0° C. and 11.5 g of a 50:50 mixture of TFE:$CO_2$ (5.7 g TFE, 5.7 g $CO_2$) is condensed under pressure. The reactor is gradually warmed to 75° C. Stirring is started as soon as the ice in the cell melts allowing the stirrer to rotate freely. Stirring is maintained for 17 hours at 75° C. before the pressure is vented from the cell, the cell opened and the contents recovered. The reaction yields 2.5 g of product (43% yield). DSC analysis yields a virgin melting point of 338.3° C., a second melt of 327.7° C. and a heat of crystallization of –37.7 J/g (2nd melt) corresponding to an estimated number average molecular weight of 260 Kg/mol.

EXAMPLE 6

To a 25-mL stainless steel reaction vessel equipped with a horizontal paddle type stirrer is added 0.11 mg $K_2S_2O_8$ and 10 mL water. The cell is cooled to well below 0° C. and 11.7 g of a 50:50 mixture of TFE:$CO_2$ (5.8 g TFE, 5.8 g $CO_2$) is condensed in under pressure. The reactor is gradually warmed to 75° C. Stirring is started as soon as the ice in the cell melts allowing the stirrer to rotate freely. Stirring is maintained for 17 hours at 75° C. before the pressure is vented from the cell, the cell opened and the contents recovered. The reaction yields 0.7 g (12% yield). DSC analysis of this product yields a virgin melting point of 334.9° C., a second melt of 327.0° C. and a heat of crystallization of –28.0 J/g (2nd melt) corresponding to an estimated number average molecular weight of 1,160 Kg/mol.

EXAMPLE 7

A 600-mL stainless steel Autoclave equipped with a stirrer agitation is seasoned with a solution of persulfate in water by heating to ca. 90° C. and filling with 500 mL of a solution of initiator (ca. 0.5 g ammonium persulfate in 500 mL water) and then heating for a couple of hours. This procedure is repeated twice before running the polymerization.

To the seasoned reactor is added 0.8 mg $K_2S_2O_8$ and 250 mL water. The Autoclave is cooled to well below 0° C. and 53.0 g of a 50:50 mixture of TFE:$CO_2$ (26.5 g TFE, 26.5 g $CO_2$) is condensed in under pressure. The reactor is gradually warmed to 75° C. Stirring is started at ca. 1000 rpm as soon as the ice in the cell melts allowing the stirrer to rotate freely. Stirring is maintained for 5 hours at 75° C. before the pressure is vented from the cell, the cell opened and the contents recovered. The reaction yields 24 g of product (90% yield). DSC analysis of this product yields a virgin melting point of 338.6° C., a second melt of 328.5° C. and a heat of crystallization of −29.4 J/g (2nd melt) corresponding to an estimated number average molecular weight of 900 Kg/mol.

EXAMPLE 8

A 600-mL stainless steel Autoclave equipped with a stirrer is seasoned with a solution of persulfate in water by heating to ca. 90° C. and then filling with 500 mL of a solution of initiator (ca. 0.5 g ammonium persulfate in 500 mL water) and then heating for a couple of hours. This procedure is repeated twice before running the polymerization.

To the seasoned reactor is added 2.6 mg $K_2S_2O_8$ and 250 mL water. The Autoclave is cooled to well below 0° C. and 50.1 g of a 50:50 mixture of TFE:$CO_2$ (25 g TFE, 25 g $CO_2$) is condensed in under pressure. The reactor is gradually warmed to 75° C. Stirring is started at ca. 1000 rpm as soon as the ice in the cell melts allowing the stirrer to rotate freely. Stirring is maintained for 5 hours at 75° C. before the pressure is vented from the cell, the cell opened and the contents recovered. The reaction yields 22.6 g of product (90% yield). DSC analysis yields a virgin melting point of 336.7° C., a second melt of 329.4° C. and a heat of crystallization of 38.2 J/g (2nd melt) corresponding to an estimated number average molecular weight if 235 Kg/mol.

EXAMPLE 9

A 600-mL stainless steel Autoclave equipped with a stirrer is seasoned with a solution of persulfate in water by heating to ca. 90° C., then filling with 500 mL of a solution of initiator (ca. 0.5 g ammonium persulfate in 500 mL water), and then heating for a couple of hours. This procedure is repeated twice before running the polymerization.

To the seasoned reactor is added 3.2 mg $K_2S_2O_8$, 10 mg ammonium perfluorooctanoate, and 250 mL water. The Autoclave is cooled to well below 0° C. and 51 g of a 50:50 mixture of TFE:$CO_2$ (25.5 g TFE, 25.5 g $CO_2$) is condensed in under pressure. The reactor is gradually warmed to 75° C. Stirring is started at ca. 1000 rpm as soon as the ice in the cell melts allowing the stirrer to rotate freely. Stirring is maintained for 5 hours at 75° C. before the pressure is vented from the cell, the cell opened and the contents recovered. The reaction yields 20.9 g of product (82% yield). DSC analysis yields a virgin melting point of 338.6° C., a second melt of 330.3° C. and a heat of crystallization of 35.3 J/g (2nd melt) corresponding to an estimated number average molecular weight if 350 Kg/mol.

EXAMPLE 10

A 600-mL stainless steel Autoclave equipped with a stirrer is seasoned with a solution of persulfate in water by heating to ca. 90° C., then filling with 500 mL of a solution of initiator (ca. 0.5 g ammonium persulfate in 500 mL water), and then heating for a couple of hours. This procedure is repeated twice before running the polymerization.

To the seasoned reactor is added 0.8 mg $K_2S_2O_8$, 10 mg ammonium perfluorooctanoate, and 250 mL water. The Autoclave is cooled to well below 0° C. and 50.9 g of a 50:50 mixture of TFE:$CO_2$ (25.4 g TFE, 25.4 g $CO_2$) is condensed in under pressure. The reactor is gradually warmed to 75° C. Stirring is started at ca. 1000 rpm as soon as the ice in the cell melts allowing the stirrer to rotate freely. Stirring is maintained for 5 hours at 75° C. before the pressure is vented from the cell, the cell opened and the contents recovered. The reaction yields 21.7 g of product (85% yield). DSC analysis yields a virgin melting point of 344.1° C., a second melt of 328.5° C. and a heat of crystallization of 35.3 J/g (2nd melt) corresponding to an estimated number average molecular weight if 350 kg/mol.

EXAMPLE 11

To a 25-mL stainless steel reaction vessel equipped with a horizontal paddle type stirrer is added 0.04 mL di(tert-butyl)peroxide, 0.11 mL methyl cyclohexane (as a chain transfer agent), and 8 mL water. The cell is cooled to well below 0° C. and 6.8 g of a 50:50 mixture of TFE:$CO_2$ (3.4 g TFE, 3.4 g $CO_2$) is condensed in under pressure, followed by an addition of 3.5 g of $CO_2$. The reactor is gradually warmed to 140° C. Stirring is started as soon as the ice in the cell melts allowing the stirrer to rotate freely. Stirring is maintained for 4 hours at 140° C. before the pressure is vented from the cell, the cell opened and the contents recovered. The reaction yields 1.1 g of low molecular weight polytetrafluoroethylene (37% yield).

EXAMPLE 12

Ethylene is polymerized in mixed medium consisting of water and carbon dioxide according to the method of Example 7 employing a water soluble initiator such as ammonium persulfate in the absence of surfactant. One skilled in the art will appreciate that other water soluble initiators and surfactants may be employed.

EXAMPLE 13

Vinyl chloride is polymerized in mixed medium consisting of water and carbon dioxide according to the method of Example 7 employing a water soluble initiator such as ammonium persulfate in the absence of surfactant. One skilled in the art will appreciate that other water soluble initiators and surfactants may be employed.

EXAMPLE 14

Methyl methacrylate is polymerized in mixed medium consisting of water and carbon dioxide employing a water soluble initiator such as ammonium persulfate according to the method of Example 7 in the absence of surfactant. One skilled in the art will appreciate that other water soluble initiators and surfactants may be employed.

EXAMPLE 15

Styrene is polymerized in mixed medium consisting of water and carbon dioxide employing a water soluble initiator such as ammonium persulfate according to Example 7 in the absence of surfactant. One skilled in the art will appreciate that other water soluble initiators and surfactants may be employed.

EXAMPLE 16

Ethylene is polymerized in mixed medium consisting of water and carbon dioxide according to the method of Example 11 employing a water insoluble initiator such as AIBN in the absence of surfactant. One skilled in the art will appreciate that other water insoluble initiators and surfactants may be employed.

EXAMPLE 17

Vinyl chloride is polymerized in mixed medium consisting of water and carbon dioxide according to the method of Example 11 employing a water insoluble initiator such as AIBN in the absence of surfactant. One skilled in the art will appreciate that other water insoluble initiators and surfactants may be employed.

EXAMPLE 18

Methyl methacrylate is polymerized in mixed medium consisting of water and carbon dioxide according to the method of Example 11 employing a water insoluble initiator such as AIBN in the absence of surfactant. One skilled in the art will appreciate that other water insoluble initiators and surfactants may be employed.

EXAMPLE 19

Styrene is polymerized in mixed medium consisting of water and carbon dioxide according to the method of Example 11 employing a water insoluble initiator such as AIBN in the absence of surfactant. One skilled in the art will appreciate that other water insoluble initiators and surfactants may be employed.

EXAMPLE 20

Ethylene and vinyl acetate are copolymerized in mixed medium consisting of water and carbon dioxide according to the method of Example 11 employing a water insoluble initiator such as AIBN, both in the presence and in the absence of surfactant. One skilled in the art will appreciate that other water insoluble initiators and surfactants may be employed.

EXAMPLE 21

Ethylene and vinyl acetate are copolymerizod in mixed medium consisting of water and carbon dioxide according to the method of Example 7 employing a water soluble initiator such as ammonium persulfate, both in the presence and in the absence of surfactant. One skilled in the art will appreciate that other water soluble initiators and surfactants may be employed.

EXAMPLE 22

Chloroprene is polymerized in mixed medium consisting of water and carbon dioxide according to the method of Example 11 employing a water insoluble initiator such as AIBN, both in the presence and in the absence of surfactant. One skilled in the art will appreciate that other water insoluble initiators and surfactants may be employed.

EXAMPLE 23

Chloroprene is polymerized in mixed medium consisting of water and carbon dioxide according to the method of Example 7, employing a water soluble initiator such as ammonium persulfate, both in the presence and in the absence of surfactant. One skilled in the art will appreciate that other water soluble initiators and surfactants may be employed.

EXAMPLE 24

Chloroprene and styrene are copolymerized in mixed medium consisting of water and carbon dioxide according to the method of Example 11 employing a water insoluble initiator such as AIBN, both in the presence and in the absence of surfactant. One skilled in the art will appreciate that other water insoluble initiators and surfactants may be employed.

EXAMPLE 25

Chloroprene and styrene are copolymerized in mixed medium consisting of water and carbon dioxide according to the method of Example 7, employing a water soluble initiator such as ammonium persulfate, both in the presence and in the absence of surfactant. One skilled in the art will appreciate that other water soluble initiators and surfactants may be employed.

EXAMPLE 26

Chloroprene and methyl methacrylate are copolymerized in mixed medium consisting of water and carbon dioxide according to the method of Example 11 employing a water insoluble initiator such as AIBN, both in the presence and in the absence of surfactant. One skilled in the art will appreciate that other water insoluble initiators and surfactants may be employed.

EXAMPLE 27

Chloroprene and methyl methacrylate are copolymerized in mixed medium consisting of water and carbon dioxide according to the method of Example 7 employing a water soluble initiator such as ammonium persulfate, both in the presence and in the absence of surfactant. One skilled in the art will appreciate that other water soluble initiators and surfactants may be employed.

EXAMPLE 28

Chloroprene and acrylonitrile are copolymerized in mixed medium consisting of water and carbon dioxide according to the method of Example 11 employing a water insoluble initiator such as AIBN, both in the presence and in the absence of surfactant. One skilled in the art will appreciate that other water insoluble initiators and surfactants may be employed.

EXAMPLE 29

Chloroprene and acrylonitrile are copolymerized in mixed medium consisting of water and carbon dioxide according to the method of Example 7 employing a water soluble initiator such as ammonium persulfate, both in the presence and in the absence of surfactant. One skilled in the art will appreciate that other water soluble initiators and surfactants may be employed.

The foregoing is illustrative of the present invention and is not to be construed as limiting thereof. The invention is defined by the following claims, with equivalents of the claims to be included therein.

That which is claimed is:

1. A multi-phase polymerization process for making a polymer, said process comprising:

providing a reaction mixture comprising a carbon dioxide phase and a separate aqueous phase, and a water insoluble polymer; and then separating said polymer from said reaction mixture.

2. A multi-phase mixture produced from the multi-phase polymerization of a monomer, said multi-phase mixture comprising:

a carbon dioxide phase and a separate aqueous phase; and a water insoluble polymer.

3. The multi-phase process according to claim 1, wherein said carbon dioxide is liquid carbon dioxide.

4. The multi-phase process according to claim 1, wherein said carbon dioxide is gaseous carbon dioxide.

5. The multi-phase process according to claim 1, wherein said carbon dioxide is supercritical carbon dioxide.

6. The multi-phase process according to claim 1, wherein said process is carried out in the presence of a surfactant.

7. The multi-phase process according to claim 1, wherein said step of separating said polymer from said mixture comprises venting said carbon dioxide phase to the atmosphere.

8. The multi-phase process according to claim 1, wherein said process is carried out in the presence of a chain transfer agent.

9. The multi-phase process according to claim 1, wherein said water insoluble polymer is a homopolymer.

10. The multi-phase process according to claim 1, wherein said water insoluble polymer is a copolymer.

11. The multi-phase process according to claim 9, wherein said homopolymer is selected from the group consisting of polyethylene, polyvinylchloride, polymethyl methacrylate, polystyrene, polychlorotrifluoroethylene, polytetrafluoroethylene, polyvinylfluoride, and polyvinylidenefluoride.

12. The multi-phase process according to claim 10, wherein said copolymer is selected from the group consisting of tetrafluoroethylene/hexafluoropropylene, tetrafluoroethylene/hexafluoropropylene/vinylidene fluoride, hexafluoropropylene/vinylidene fluoride, perfluoro(methyl vinyl ether)/vinylidene fluoride, perfluoro(methyl vinyl ether)/vinylidene fluoride/tetrafluoroethylene, chlorotrifluoroethylene/vinylidene fluoride, chlorotrifluoroethylene/ethylene, chlorotrifluoroethylene/tetrafluoroethylene/ethylene, tetrafluoroethylene/perfluoro(propyl vinyl ether), tetrafluoroethylene/perfluoro(methyl vinyl ether), tetrafluoroethylene/perfluoro(2,2-dimethyl-1,3-dioxole), tetrafluoroethylene/ethylene, tetrafluoroethylene/propylene, tetrafluoroethylene/$CF_2$=$CFOCF_2CF(CF_3)OCF_2CF_2SO_2F$, tetrafluoroethylene/$CF_2$=$CFOCF_2CF_2SO_2F$, tetrafluoroethylene/hexafluoropropylene/perfluoro(propyl vinyl ether), styrene/butadiene, styrene/chloroprene, styrene/acylonitrile, acrylonitrile/butadiene, ethylene/vinyl acetate, chloroprene/methyl methacrylate, and chloroprene/acrylonitrile.

13. The multi-phase process according to claim 2, wherein said carbon dioxide is liquid carbon dioxide.

14. The multi-phase process according to claim 2, wherein said carbon dioxide is gaseous carbon dioxide.

15. The multi-phase process according to claim 2, wherein said carbon dioxide is supercritical carbon dioxide.

16. The multi-phase process according to claim 2, wherein said water insoluble polymer is a homopolymer.

17. The multi-phase process according to claim 2, wherein said water insoluble polymer is a copolymer.

18. The multi-phase process according to claim 16, wherein said homopolymer is selected from the group consisting of polyethylene, polyvinylchloride, polymethyl methacrylate, polystyrene, polychlorotrifluoroethylene, polytetrafluoroethylene, polyvinylfluoride, and polyvinylidenefluoride.

19. The multi-phase process according to claim 17, wherein said copolymer is selected from the group consisting of tetrafluoroethylene/hexafluoropropylene, tetrafluoroethylene/hexafluoropropylene/vinylidene fluoride, hexafluoropropylene/vinylidene fluoride, perfluoro(methyl vinyl ether)/vinylidene fluoride, perfluoro(methyl vinyl ether)/vinylidene fluoride/tetrafluoroethylene, chlorotrifluoroethylene/vinylidene fluoride, chlorotrifluoroethylene/ethylene, chlorotrifluoroethylene/tetrafluoroethylene/ethylene, tetrafluoroethylene/perfluoro(propyl vinyl ether), tetrafluoroethylene/perfluoro(methyl vinyl ether), tetrafluoroethylene/perfluoro(2,2-dimethyl-1,3-dioxole), tetrafluoroethylene/ethylene, tetrafluoroethylene/propylene, tetrafluoroethylene/$CF_2$=$CFOCF_2CF(CF_3)OCF_2CF_2SO_2F$, tetrafluoroethylene/$CF_2$=$CFOCF_2CF_2SO_2F$, tetrafluoroethylene/hexafluoropropylene/perfluoro(propyl vinyl ether), styrene/butadiene, styrene/chloroprene, styrene/acylonitrile, acrylonitrile/butadiene, ethylene/vinyl acetate, chloroprene/methyl methacrylate, and chloroprene/acrylonitrile.

* * * * *

UNITED STATES PATENT AND TRADEMARK OFFICE
CERTIFICATE OF CORRECTION

PATENT NO. : 5,530,077
DATED : 25 June 1996
INVENTOR(S) : Joseph M. DeSimone, Timothy Romack It is certified that error appears in the above-indentified patent and that said Letters Patent is hereby corrected as shown below:

Column 5, line 3, please delete
"$\{CF_3CF_2CF_2)[CF(CF(CF_3)CF_2O]$" and replace it with
--$\{CF_3CF_2CF_2)[CF(CF_3)CF_2O]$--

Column 6, line 17, change "iodide" to --iodides--.

Column 14, Claims 13, 14, 15, 16, 17, 18 and 19, lines 11, 1: 15, 17, 19 and 21 change "process" to read --mixture--.

Signed and Sealed this

Fourth Day of March, 1997

Attest:

BRUCE LEHMAN

*Attesting Officer*  Commissioner of Patents and Trademarks